United States Patent
Bae et al.

(10) Patent No.: US 9,177,746 B2
(45) Date of Patent: Nov. 3, 2015

(54) ELECTROSTATIC DISCHARGING STRUCTURE AND METHOD OF MANUFACTURING THE SAME

(71) Applicant: SAMSUNG ELECTRO-MECHANICS CO., LTD., Suwon-si, Gyeonggi-do (KR)

(72) Inventors: Jun Hee Bae, Suwon-si (KR); Sang Moon Lee, Suwon-si (KR); Sung Kwon Wi, Suwon-si (KR); Yong Suk Kim, Suwon-si (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 36 days.

(21) Appl. No.: 14/100,622

(22) Filed: Dec. 9, 2013

(65) Prior Publication Data

US 2014/0159565 A1 Jun. 12, 2014

(30) Foreign Application Priority Data

Dec. 10, 2012 (KR) .................. 10-2012-0142803

(51) Int. Cl.
*H01J 9/02* (2006.01)
*H01J 1/304* (2006.01)
*B82Y 30/00* (2011.01)
*B82Y 40/00* (2011.01)
*H01T 1/20* (2006.01)

(52) U.S. Cl.
CPC . *H01J 9/02* (2013.01); *H01J 1/304* (2013.01); *H01J 9/025* (2013.01); *B82Y 30/00* (2013.01); *B82Y 40/00* (2013.01); *H01T 1/20* (2013.01)

(58) Field of Classification Search
CPC .......... B82Y 30/00; B82Y 40/00; H01J 1/48; H01J 9/02
See application file for complete search history.

(56) References Cited

U.S. PATENT DOCUMENTS

| | | | |
|---|---|---|---|
| 7,567,414 B2 * | 7/2009 | Bertin et al. ................ | 361/56 |
| 7,659,624 B2 * | 2/2010 | Mayya Kolake et al. ..... | 257/741 |
| 7,851,863 B2 | 12/2010 | Tokunaga et al. | |
| 8,519,817 B2 * | 8/2013 | Ishihara et al. ............. | 338/22 R |
| 2002/0167375 A1 * | 11/2002 | Hoppe et al. .................. | 333/186 |
| 2008/0157363 A1 * | 7/2008 | Mayya Kolake et al. ..... | 257/741 |
| 2008/0280136 A1 * | 11/2008 | Zachariah et al. ............ | 428/367 |
| 2009/0269560 A1 * | 10/2009 | Dhinojwala et al. .......... | 428/206 |
| 2009/0294753 A1 * | 12/2009 | Hauge et al. .................... | 257/9 |
| 2010/0020454 A1 | 1/2010 | Hirobe et al. | |
| 2010/0157501 A1 | 6/2010 | Asakura et al. | |
| 2011/0317326 A1 * | 12/2011 | Onishi et al. .................. | 361/212 |
| 2012/0006583 A1 * | 1/2012 | Ishihara et al. ............... | 174/254 |
| 2012/0099231 A1 * | 4/2012 | Ishihara et al. ................ | 361/56 |

FOREIGN PATENT DOCUMENTS

| | | |
|---|---|---|
| JP | 2004-014466 A | 1/2004 |
| JP | 2007103529 A | 4/2007 |

* cited by examiner

*Primary Examiner* — Thomas A Hollweg
(74) *Attorney, Agent, or Firm* — McDermott Will & Emery LLP

(57) ABSTRACT

Disclosed herein are an electrostatic discharging structure including single-wall carbon nano tubes disposed between electrodes at a predetermined interval to precisely control discharge starting voltage generating a discharge phenomenon between electrodes, and a method of manufacturing an electrostatic discharging structure.

17 Claims, 3 Drawing Sheets

ELECTROSTATIC DISCHARGING STRUCTURE AND METHOD OF MANUFACTURING THE SAME

CROSS REFERENCE(S) TO RELATED APPLICATIONS

This application claims the benefit under 35 U.S.C. Section 119 of Korean Patent Application Serial No. 10-2012-0142803 entitled "Electrostatic Discharging Structure And Method Of Manufacturing The Same" filed on Dec. 10, 2012, which is hereby incorporated by reference in its entirety into this application.

BACKGROUND OF THE INVENTION

1. Technical Field

The present invention relates to an electrostatic discharging structure and a method of manufacturing the same.

2. Description of the Related Art

Recently, in accordance with the tendency of miniaturization, slimness and high function of electronic devices, demands for performance improvement, miniaturization and slimness of electronic components applied to electronic devices have increased.

Further, as portability of electronic devices becomes more important, the electronic devices need to be operated at high speed under low-voltage and low-current environment, and therefore the withstand voltage of the electronic components needs to be reduced accordingly.

However, various types of electronic devices to which the electronic components are applied may be frequently applied with overvoltage or overcurrent, that is, not within a tolerable range due to instability, static electricity, and the like, of an input power supply.

When overvoltage or overcurrent is applied to electronic devices, the deterioration phenomenon of electronic devices or the malfunction of electronic components and electronic device including the same may be induced.

Therefore, attempts to develop technologies for discharging static electricity through a safe path so as to prevent static electricity from being introduced into electronic devices or electronic components or portions sensitive to static electricity from being damaged even though static electricity is introduced into electronic devices have been continuously conducted.

Meanwhile, Patent Documents 1, 2, and 3, and the like, disclose an electrostatic protection device, and the like.

However, the existing electrostatic protection technologies including Patents 1 to 3, and the like, provide a structure of reducing discharge starting voltage but have a limitation in precisely controlling a range of the discharge starting voltage.

RELATED ART DOCUMENT

Patent Document (Patent Document 1) US Patent Laid-Open Publication No. 2010/0157501
(Patent Document 2) US Patent Laid-Open Publication No. 2010/0020454
(Patent Document 3) U.S. Pat. No. 7,851,863

SUMMARY OF THE INVENTION

An object of the present invention is to provide an electrostatic discharging structure capable of more precisely controlling a discharge starting voltage region while reducing a discharging starting voltage.

Another object of the present invention is to provide a method of manufacturing an electrostatic discharging structure capable of more precisely controlling a discharge starting voltage region while reducing a discharging starting voltage.

According to an exemplary embodiment of the present invention, there is provided an electrostatic discharging structure, including: a base substrate formed of an insulating material; a first electrode formed on one surface of the base substrate; a second electrode formed on one surface of the base substrate and a second electrode electrically isolated from the first electrode by being separated from the first electrode by a predetermined interval; and a discharging structure provided between the first electrode and the second electrode and formed of a plurality of carbon nano tubes that are separated from each other.

The carbon nano tube may be a single-wall carbon nanotube (SWCNT).

The single-wall carbon nano tube may be provided so that one end in a longitudinal direction of the single-wall carbon nano tube contacts the base substrate and the other surface in a longitudinal direction thereof faces upwardly.

The electrostatic discharging structure may generate a discharge phenomenon when a voltage difference of at least 100 V is formed between the first electrode and the second electrode, and the single-wall carbon nano tube may have a diameter of 0.5 to 3 nm and a length of 1 to 10 μm and may be spaced apart from other adjacent single-wall carbon nano tubes at an interval of 20 to 100 nm.

The single-wall carbon nano tube may further include a catalyst layer that contacts a surface of the base substrate.

The electrostatic discharging structure may further include: an insulating portion covering the first electrode, the second electrode, and the discharging structure.

According to another exemplary embodiment of the present invention, there is provided a method of manufacturing an electrostatic discharging structure, including: providing a base substrate formed of an insulating material; forming a first electrode and a second electrode spaced apart from each other at a predetermined interval on one surface of the base substrate; and forming a discharging structure formed of a plurality of carbon nano tubes between the first electrode and the second electrode, wherein the discharging structure is formed by forming a catalyst layer on a surface of the base substrate and growing the carbon nano tube.

The carbon nano tube may be a single-wall carbon nanotube (SWCNT).

The catalyst layer may be formed by carrying out processes of forming a first layer including aluminum particles on the surface of the base substrate; forming a second layer including iron particles on a surface of the first layer; and forming a third layer including aluminum particles on a surface of the second layer.

The first layer may have a thickness of 1.5 to 2.5 nm, the second layer may have a thickness of 0.5 to 1.5 nm, and the third layer may have a thickness of 14.5 to 15.5 nm.

The single-wall carbon nano tube may be provided so that one end in a longitudinal direction of the single-wall carbon nano tube contacts the base substrate and the other end in a longitudinal direction thereof faces upwardly.

The electrostatic discharging structure may generate a discharge phenomenon when a voltage difference of at least 100 V is formed between the first electrode and the second electrode, and the single-wall carbon nano tube may have a diameter of 0.5 to 3 nm and a length of 1 to 10 μm and may be spaced apart from other adjacent single-wall carbon nano tubes at an interval of 20 to 100 nm.

The single-wall carbon nano tube may be formed by covering the catalyst layer with a mask and performing thermal chemical vapor deposition (TCVD) processing.

The mask may be provided with a plurality of through holes having a diameter of 0.5 to 3 nm at an interval of 20 to 100 nm, and a thickness of the mask may be 1 to 10 μm.

The method of manufacturing an electrostatic discharging structure may further include: forming an insulating portion covering the first electrode, the second electrode, and the discharging structure.

DESCRIPTION OF THE PREFERRED EMBODIMENTS

Figure 1:
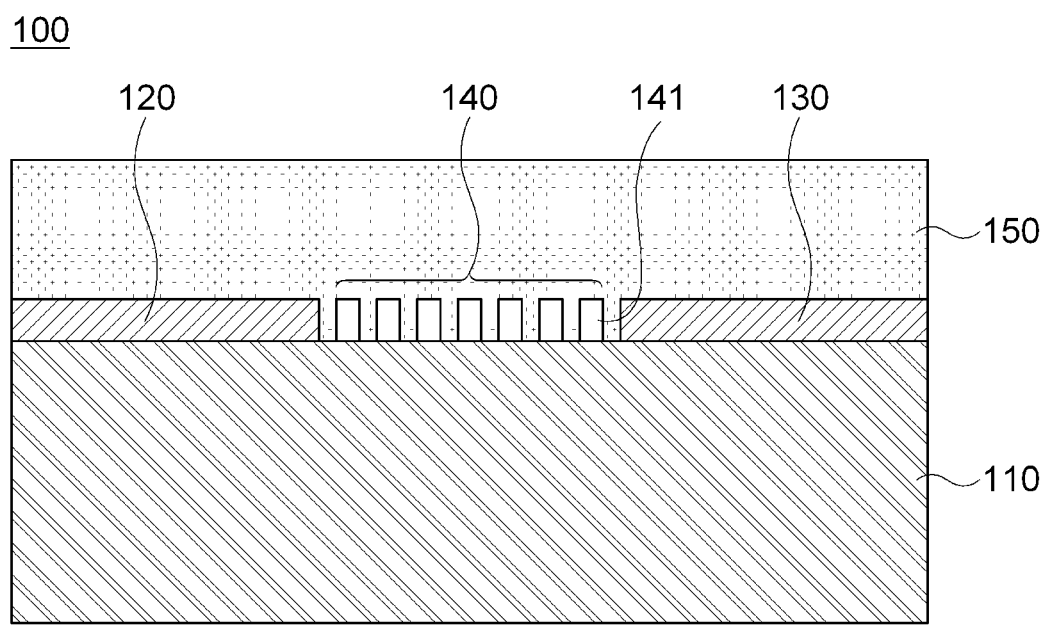
FIG. 1 is a cross-sectional view schematically illustrating an electrostatic discharging structure according to an exemplary embodiment of the present invention.

Various advantages and features of the present invention and methods accomplishing thereof will become apparent from the following description of embodiments with reference to the accompanying drawings. However, the present invention may be modified in many different forms and it should not be limited to the embodiments set forth herein. These embodiments may be provided so that this disclosure will be thorough and complete, and will fully convey the scope of the invention to those skilled in the art. Like reference numerals throughout the description denote like elements.

Terms used in the present specification are for explaining the embodiments rather than limiting the present invention. Unless explicitly described to the contrary, a singular form includes a plural form in the present specification. The word "comprise" and variations such as "comprises" or "comprising," will be understood to imply the inclusion of stated constituents, steps, operations and/or elements but not the exclusion of any other constituents, steps, operations and/or elements.

For simplification and clearness clarity of the illustration, a general configuration scheme will be shown in the accompanying drawings, and a detailed description of the feature and the technology well known in the art will be omitted in order to prevent a discussion of exemplary embodiments of the present invention from being unnecessarily obscure. Additionally, components shown in the accompanying drawings are not necessarily shown to scale. For example, size of some components shown in the accompanying drawings may be exaggerated as compared with other components in order to assist in understanding of the exemplary embodiments of the present invention. Like reference numerals on different drawings will denote like components, and similar reference numerals on different drawings will denote similar components, but are not necessarily limited thereto.

In the specification and the claims, terms such as "first", "second", "third", "fourth", and the like, if any, will be used to distinguish similar components from each other and be used to describe a specific sequence or a generation sequence, but is not necessarily limited thereto. It may be understood that these terms are compatible with each other under an appropriate environment so that exemplary embodiments of the present invention to be described below may be operated in a sequence different from a sequence shown or described herein. Likewise, in the present specification, in the case in which it is described that a method includes a series of steps, a sequence of these steps suggested herein it not necessarily a sequence in which these steps may be executed. That is, any described step may be omitted and/or any other step that is not described herein may be added to the method.

In the specification and the claims, terms such as "left", "right", "front", "rear", "top", "bottom", "over", "under", and the like, if any, are not necessarily to indicate relative positions that are not changed, but are used for description. It may be understood that these terms are compatible with each other under an appropriate environment so that exemplary embodiments of the present invention to be described below may be operated in a direction different from a direction shown or described herein. A term "connected" used herein is defined as being directly or indirectly connected in an electrical or non-electrical scheme. Targets described as being "adjacent to" each other may physically contact each other, be close to each other, or be in the same general range or region, in the context in which the above phrase is used. Here, a phrase "in an exemplary embodiment" means the same exemplary embodiment, but is not necessarily limited thereto.

Hereinafter, a configuration and an acting effect of exemplary embodiments of the present invention will be described in more detail with reference to the accompanying drawings.

Figure 2:
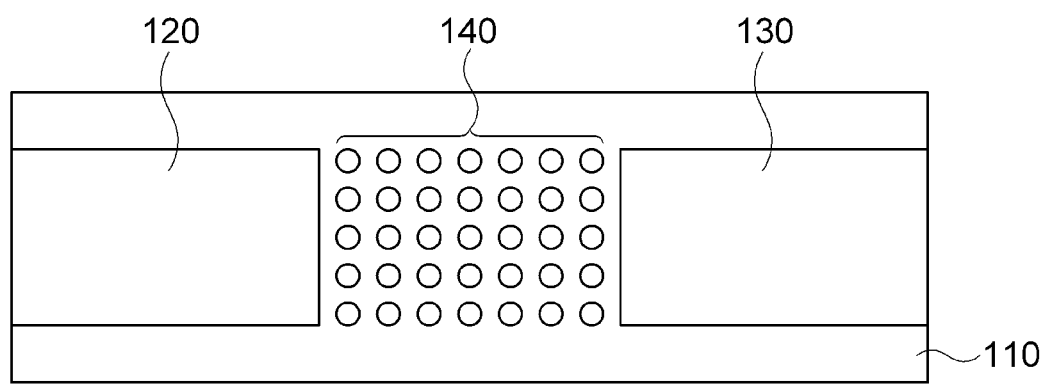
FIG. 2 is a plan view schematically illustrating a plane structure in a state in which an insulating portion is removed from FIG. 1.

FIG. 1 is a cross-sectional view schematically illustrating an electrostatic discharging structure 100 according to an exemplary embodiment of the present invention and FIG. 2 is a plan view schematically illustrating a plane structure in a state in which an insulating portion 150 is removed from FIG. 1.

Referring to FIGS. 1 and 2, the electrostatic discharging structure 100 according to the embodiment of the present invention may include a base substrate 110, a first electrode 120, a second electrode 130, and a discharging structure 140.

The base substrate 110 may be formed of an insulating material and one surface of the base substrate 110 is provided with the first electrode 120 and the second electrode 130.

In this case, the first electrode 120 and the second electrode 130 are spaced apart from each other at a predetermined interval, such that the first electrode 120 and the second electrode 130 are electrically isolated from each other.

In this configuration, a region between the first electrode 120 and the second electrode 130 is provided with a discharging structure 140, which may serve to generate a discharge phenomenon between the first electrode 120 and the second electrode 130 when a voltage difference between the first electrode 120 and the second electrode 130 exceeds a normal range.

Meanwhile, the discharging structure 140 may be formed of a plurality of carbon nano tubes (CNTs) 141 that are separated from each other, in which the carbon nano tube 141 may be a single-wall carbon nano tube 141.

Further, the single-wall carbon nano tube 141 may be preferably disposed in a vertical direction to a surface of the base substrate 110 on which the first electrode 120 and the second electrode 130 are formed.

That is, one end in a longitudinal direction of the single-wall carbon nano tube 141 may contact the base substrate 110 and the other end thereof may be disposed upwardly.

The carbon nano tube may be classified into a single-wall carbon nano tube (SWCNT) and a multi-wall carbon nano tube (MWCNT). Generally, the single-wall carbon nano tube has more excellent electrical conductivity than the multi-wall carbon nano tube.

Further, an interval between two single-wall carbon nano tubes may be constantly maintained as a whole, as compared with two multi-wall carbon nano tubes.

Considering these aspects, it can be understood that it is more advantageous in constantly maintaining the interval between the single-wall carbon nano tubes 141 when the discharging structure 140 is formed of the single-wall carbon nano tube 141 than when the discharging structure is formed of the multi-wall carbon nano tube.

Therefore, when the voltage difference over the predetermined discharge starting voltage is formed between the first electrode 120 and the second electrode 130, the plurality of single-wall carbon nano tubes 141 serve as a stepping-stone in a region between the first electrode 120 and the second electrode 130 to generate the discharge phenomenon.

In this case, as the discharge structure 140 is formed of the single-wall carbon nano tubes 141 that may be constantly maintained, the range of voltage in which the discharge phenomenon is generated may be limited to a predetermined range.

For example, as described in the foregoing Patent Document 1, and the like, when a conductive inorganic material is merely disposed between the two electrodes, a deviation in the interval between the conductive inorganic materials is increased, such that the range of the discharge starting voltage may not be limited precisely.

That is, when the electrostatic protection components are mass produced by using the technology disclosed in Patent Document 1, it is difficult to maintain the interval between the conductive inorganic materials to a predetermined range, in each product.

Therefore, any of the electrostatic protection components produced by reflecting the technologies disclosed in Patent Document 1 may generate the discharge phenomenon at 200 V and other components may generate the discharge phenomenon at 300V.

However, when deviation in the discharge starting voltage is serious, it is difficult to achieve the optimized design when high-performance electronic devices are manufactured using the corresponding components.

On the other hand, the electrostatic discharging structure 100 according to the exemplary embodiment of the present invention may more remarkably reduce the deviation in the discharge starting voltage than the related art since the single-wall carbon nano tubes 141 forming the discharging structure 140 may maintain a predetermined interval from each other.

As an example, in the electrostatic discharging structure 100 including the discharge structure 140 in which a diameter of the single-wall carbon nano tube 141 is 0.5 to 3 nm, a length thereof is 1 to 10 μm, and other adjacent single-wall carbon nano tubes 141 are spaced apart from each other at an interval of 20 to 100 nm, the discharge phenomenon is generated when the voltage difference of 100 V or more is formed between the first electrode 120 and the second electrode 130.

In this case, in order to increase the discharge starting voltage, there is a need to expand the interval between the single-wall carbon nano tubes 141 and in order to reduce the discharge starting voltage, there is a need to further narrow the interval between the single-wall carbon nano tubes 141.

Meanwhile, the single-wall carbon nano tube 141 may be grown using a catalyst layer.

Further, the exposed surfaces of the first electrode 120, the second electrode 130, and the discharging structure 140 may be provided with an insulating portion 150 formed of an insulating material.

Figure 3:
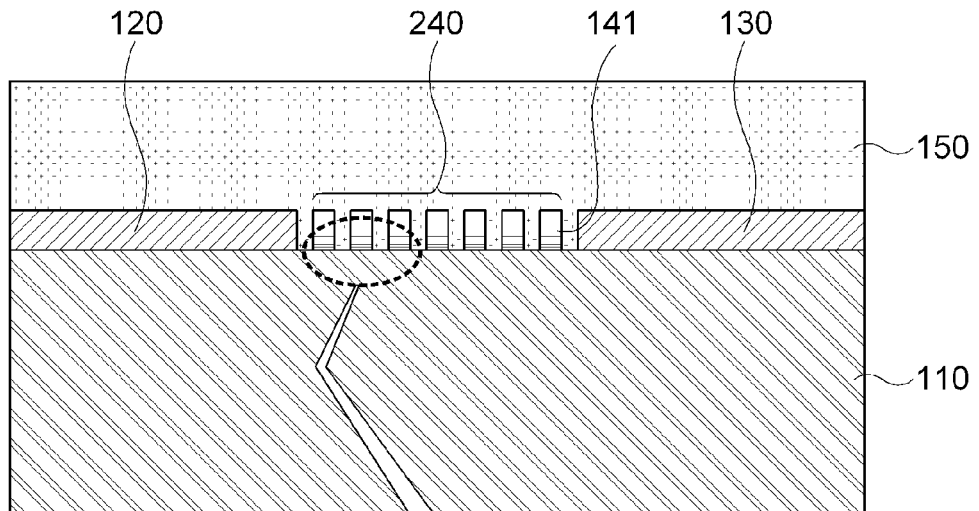
FIG. 3 is a cross-sectional view schematically illustrating an electrostatic discharging structure according to another exemplary embodiment of the present invention.
Figure 3:
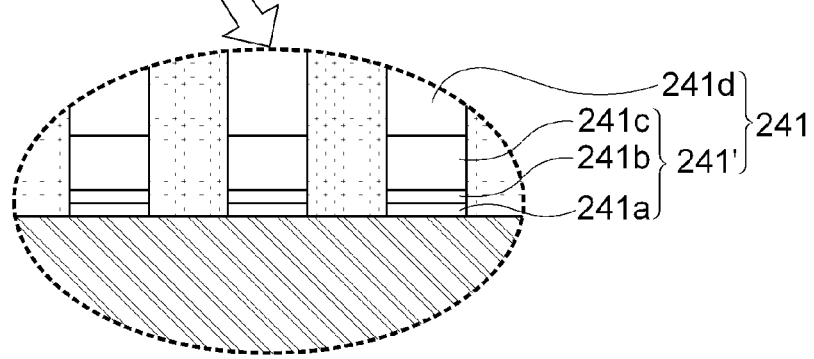

FIG. 3 is a cross-sectional view schematically illustrating an electrostatic discharging structure 200 according to another exemplary embodiment of the present invention.

Referring to FIG. 3, it can be understood that in the electrostatic discharging structure 200 according to the exemplary embodiment of the present invention, a lower part of the carbon nano tube 241 forming the discharging structure 240 may be provided with a catalyst layer 241'.

The catalyst layer 241' may be formed by sequentially stacking a first layer 241a including aluminum particles, a second layer 241b including iron particles, and a third layer 241c including aluminum particles on the base substrate 110.

In this case, the first layer 241a, the second layer 241b, and the third layer 241c may be formed by a sputtering method.

The so formed catalyst layer 241' may be subjected to thermal chemical vapor deposition (TCVD) processing to form a growth portion 241d, such that the single-wall carbon nano tube 241 may be formed.

Referring to FIGS. 1 and 2, other matters are similar to the foregoing embodiments and therefore, the overlapping description thereof will be omitted.

The electrostatic discharging structure configured as described above may be applied to a filter, and the like.

As electronic devices and electronic components mounted in the corresponding electronic devices are minimized and have high performance and are operated under the low-voltage and low-current environment, the phenomenon in which the circuit of the electronic devices is damaged or the signal is distorted may occur when abnormal voltage or noise is introduced into the electronic devices from the outside.

As factors of the abnormal voltage and noise, there are switching voltage generated within a circuit, power noise included in power voltage, unnecessary electromagnetic signals, or electromagnetic noise, and the like. As a means for preventing the abnormal voltage and the high frequency noise from being introduced into the circuit, a filter such as a common mode filter (CMF), and the like, has been used.

The stability of electronic devices may be more improved by applying the electrostatic discharging structures 100 and 200 according to the exemplary embodiment of the present invention to the filter, and the like.

In particular, the discharging structures 100 and 200 according to the exemplary embodiment of the present invention can more precisely control the discharge starting voltage than the related art, and therefore may reduce the problem in that the signal may be lost due to unnecessary discharge while reducing the discharge starting voltage for protecting devices.

Figure 4:
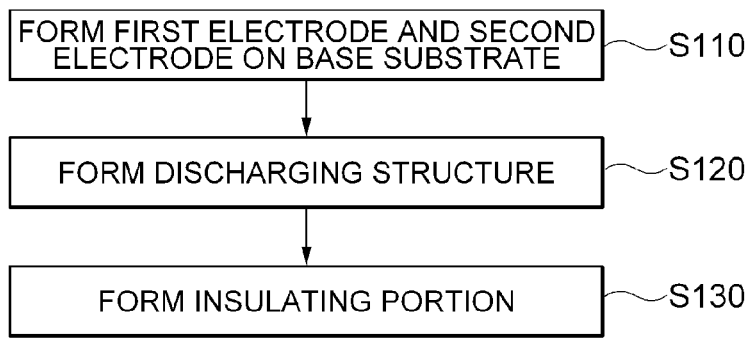
FIG. 4 is a flow chart schematically showing a method of manufacturing an electrostatic discharging structure according to the exemplary embodiment of the present invention.

FIG. 4 is a flow chart schematically showing a method of manufacturing an electrostatic discharging structure according to the exemplary embodiment of the present invention.

Referring to FIGS. 1 to 4, first, the first electrode 120 and the second electrode 130 are formed on one surface of the base substrate 110 (S110).

Next, the discharge structure 140 is formed between the first electrode 120 and the second electrode 130 (S120).

Next, the insulating portion 150 that covers the first electrode 120, the second electrode 130, and the discharge structure 140 is formed (S130).

Figure 5:
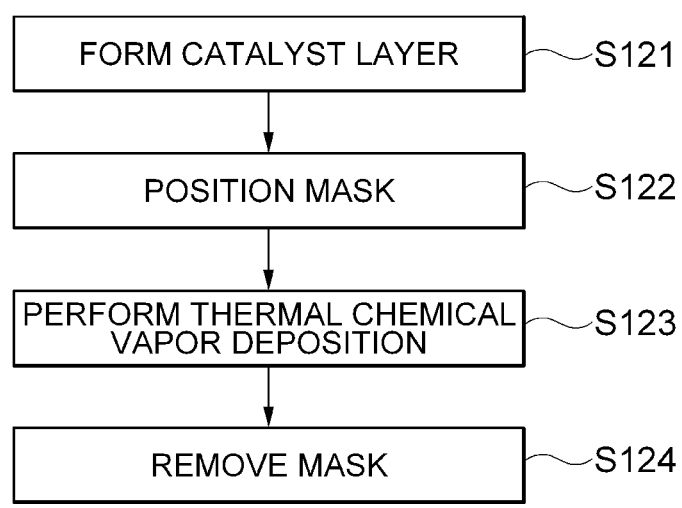
FIG. 5 is a flow chart illustrating in detail a process of forming a discharging structure during a process of manufacturing an electrostatic discharging structure according to the exemplary embodiment of the present invention.

FIG. 5 is a flow chart illustrating in detail a process of forming the discharging structure 140 during a process of manufacturing an electrostatic discharging 100 structure according to the exemplary embodiment of the present invention.

Referring to FIGS. 1 to 5, first, the catalyst layer 241' is formed between the first electrode 120 and the second electrode 130 (S121).

Here, the catalyst layer 241' may include a first layer 241a formed on the base substrate 110 by sputtering a material including aluminum particles on the base substrate 110, a second layer 241b formed by sputtering a material including iron particles on a surface of the first layer 241a, and a third layer 241c formed by sputtering a material including aluminum particles on a surface of the second layer 241b.

In this case, the first layer 241a may have a thickness of 1.5 to 2.5 nm, the second layer 241b may have a thickness of 0.5 to 1.5 nm, and the third layer 241c may have a thickness of 14.5 to 15.5 nm.

Further, the plurality of catalyst layers 241' may be provided at a position at which the single-wall carbon nano tube 241 is formed, in a cylindrical shape having a diameter in proportion to the diameter of the single-wall carbon nano tube 241.

In this state, the single-wall carbon nano tube 141 may be formed by performing the thermal chemical vapor deposition processing.

Meanwhile, when the thermal chemical vapor deposition is performed in the state in which the catalyst layer 241' is formed, the single-wall carbon nano tube 241 may not be grown in a vertical direction. When the single-wall carbon nano tube 241 is not substantially grown in a vertical direction, the interval between the adjacent single-wall carbon nano tubes 241 may not be constant, such that the discharge starting voltage may not be controlled with the precise range.

In order to solve the above problems, it is preferable to dispose a mask (not illustrated) on the catalyst layer 241' prior to performing the thermal chemical vapor deposition processing (S122).

In this case, the mask may be provided with through holes penetrating through a region corresponding to the region in which the single-wall carbon nano tube 241 is formed.

That is, as described above, at the time of forming the discharging structure 240 which includes the single-wall carbon nano tube 241 having a diameter of 0.5 to 3 nm and is provided in plural at the interval of 20 to 100 nm, the mask that is provided with the through holes having a diameter of 0.5 to 3 nm at an interval of 20 to 100 nm may be used.

Further, it is preferable to control the thickness of the mask to correspond to the length of required single-wall carbon nano tube 241.

Next, the single-wall carbon nano tube 241 is formed by performing the thermal chemical vapor deposition processing (S123).

After the single-wall carbon nano tube 241 is formed as needed, the mask is removed (S124).

Therefore, it is possible to more precisely control the interval between the single-wall carbon nano tubes 241 than the related art, according to which region the discharge starting voltage generating the discharge phenomenon between the first electrode 120 and the second electrode 130 that are disposed at both sides of the discharge structure 240 is present in.

As a result, it is possible to manufacture the electrostatic discharge structures 100 and 200 with the precisely controlled discharge starting voltage.

As described above, according to the exemplary embodiments of the present invention, it is possible to precisely control the discharge starting voltage at which the discharge phenomenon occurs between the electrodes.

Further, according to the exemplary embodiments of the present invention, it is possible to provide the method of manufacturing an electrostatic discharging structure capable of precisely controlling the discharge starting voltage.

Although the electrostatic discharging structure and the method of manufacturing the same according to the exemplary embodiments of the present invention are described above, the present invention is not limited thereto and therefore, applications and modifications thereof can be made by those skilled in the art.

What is claimed is:

1. An electrostatic discharging structure, comprising:
   a base substrate formed of an insulating material;
   a first electrode disposed on one surface of the base substrate;
   a second electrode disposed on the one surface of the base substrate, wherein the second electrode is electrically isolated from the first electrode by being separated from the first electrode by a predetermined interval; and
   a discharging structure provided between the first electrode and the second electrode and formed of a plurality of carbon nano tubes that are separated from each other,
   wherein all carbon nano tubes are evenly separated from each other at a constant interval between the first electrode and the second electrode.

2. The electrostatic discharging structure according to claim 1, wherein the carbon nano tubes are single-wall carbon nano tubes (SWCNT).

3. The electrostatic discharging structure according to claim 2, wherein each single-wall carbon nano tube is provided so that one end in a longitudinal direction of the single-wall carbon nano tube contacts the base substrate and the other end in a longitudinal direction thereof faces in a direction away from the one surface of the base substrate.

4. The electrostatic discharging structure according to claim 3, wherein the electrostatic discharging structure generates a discharge phenomenon when a voltage difference of at least 100 V is formed between the first electrode and the second electrode, and
   each single-wall carbon nano tube has a diameter of 0.5 to 3 nm and a length of 1 to 10 μm and is spaced apart from other adjacent single-wall carbon nano tubes at an interval of 20 to 100 nm.

5. The electrostatic discharging structure according to claim 3, wherein each single-wall carbon nano tube further includes a catalyst layer that contacts a surface of the base substrate.

6. The electrostatic discharging structure according to claim 3, further comprising:
   an insulating portion covering the first electrode, the second electrode, and the discharging structure.

7. A method of manufacturing an electrostatic discharging structure, comprising:
   providing a base substrate formed of an insulating material;
   forming a first electrode and a second electrode spaced apart from each other at a predetermined interval on one surface of the base substrate; and forming a discharging structure formed of a plurality of carbon nano tubes between the first electrode and the second electrode, wherein the discharging structure is formed by forming a catalyst layer on a surface of the base substrate and growing the carbon nano tubes.

8. The method according to claim 7, wherein the carbon nano a tubes are single-wall carbon nano tubes (SWCNT).

9. The method according to claim 8, wherein the catalyst layer is formed by carrying out processes of:

forming a first layer including aluminum particles on the surface of the base substrate;

forming a second layer including iron particles on a surface of the first layer; and forming a third layer including aluminum particles on a surface of the second layer.

10. The method according to claim 9, wherein the first layer has a thickness of 1.5 to 2.5 nm, the second layer has a thickness of 0.5 to 1.5 nm, and the third layer has a thickness of 14.5 to 15.5 nm.

11. The method according to claim 8, wherein each single-wall carbon nano tube is provided so that one end in a longitudinal direction of the single-wall carbon nano tube contacts the base substrate and the other end in a longitudinal direction thereof faces in a direction away from the one surface of the base substrate.

12. The method according to claim 11, wherein the electrostatic discharging structure generates a discharge phenomenon when a voltage difference of at least 100 V is formed between the first electrode and the second electrode, and each single-wall carbon nano tube has a diameter of 0.5 to 3 nm and a length of 1 to 10 μm and is spaced apart from other adjacent single-wall carbon nano tubes at an interval of 20 to 100 nm.

13. The method according to claim 12, wherein each single-wall carbon nano tube is formed by covering the catalyst layer with a mask and performing thermal chemical vapor deposition (TCVD) processing.

14. The method according to claim 13, wherein the mask is provided with a plurality of through holes having a diameter of 0.5 to 3 nm at an interval of 20 to 100 nm.

15. The method according to claim 14, wherein a thickness of the mask is 1 to 10 μm.

16. The method according to claim 7, further comprising:

forming an insulating portion covering the first electrode, the second electrode, and the discharging structure.

17. The method according to claim 7, wherein the forming of the discharging structure comprises forming the plurality of carbon nano tubes to all be evenly separated from each other at a constant interval between the first electrode and the second electrode.

* * * * *